US011128452B2

(12) United States Patent
Vaněk et al.

(10) Patent No.: US 11,128,452 B2
(45) Date of Patent: Sep. 21, 2021

(54) ENCRYPTED DATA SHARING WITH A HIERARCHICAL KEY STRUCTURE

(71) Applicant: Avast Software s.r.o., Prague (CZ)

(72) Inventors: Petr Vaněk, Velké Němčice (CZ); Jan Schwarz, Letovice (CZ); Pavel Studený, Praha 5 (CZ)

(73) Assignee: Avast Software s.r.o., Prague (CZ)

( * ) Notice: Subject to any disclaimer, the term of this patent is extended or adjusted under 35 U.S.C. 154(b) by 289 days.

(21) Appl. No.: 15/933,290

(22) Filed: Mar. 22, 2018

(65) Prior Publication Data

US 2018/0278414 A1 Sep. 27, 2018

Related U.S. Application Data

(60) Provisional application No. 62/476,763, filed on Mar. 25, 2017.

(51) Int. Cl.
*H04L 9/08* (2006.01)
*H04L 9/30* (2006.01)
*H04L 9/14* (2006.01)

(52) U.S. Cl.
CPC ............ *H04L 9/085* (2013.01); *H04L 9/0822* (2013.01); *H04L 9/0861* (2013.01); *H04L 9/0869* (2013.01); *H04L 9/14* (2013.01); *H04L 9/3066* (2013.01)

(58) Field of Classification Search
CPC ..... H04L 9/085; H04L 9/0869; H04L 9/0822; H04L 9/14; H04L 9/3066; H04L 9/0861; H04L 2463/062; H04L 9/0844; H04L 9/30; H04L 2209/24; H04L 9/0841; H04L 9/0894; H04L 9/0825; H04L 9/0891; H04L 9/0838; H04L 9/0863; H04L 63/061; H04L 9/0866; H04L 9/088; H04L 63/0435; H04L 9/0643; H04L 63/0442; H04L 2463/061; H04L 9/083; H04L 9/0637; H04L 9/0819; H04L 9/0816; H04W 12/0401

See application file for complete search history.

(56) References Cited

U.S. PATENT DOCUMENTS

| | | | | |
|---|---|---|---|---|
| 5,937,066 A | * | 8/1999 | Gennaro | H04L 9/0841 380/286 |
| 6,704,871 B1 | * | 3/2004 | Kaplan | G06F 21/72 713/192 |
| 7,813,512 B2 | * | 10/2010 | Futa | H04L 9/0844 380/285 |
| 7,936,873 B2 | | 5/2011 | Farrugia et al. | |
| 8,739,308 B1 | * | 5/2014 | Roth | H04L 9/0819 726/32 |

(Continued)

OTHER PUBLICATIONS

Chu et al., Key-Aggregate Cryptosystem for Scalable Data Sharing in Cloud Storage, IEEE, Feb. 2014.*

(Continued)

*Primary Examiner* — David Garcia Cervetti
(74) *Attorney, Agent, or Firm* — Erickson Kernell IP, LLC; William B. Kircher

(57) ABSTRACT

A data set shared by multiple nodes is encrypted. The data set can be split into independent records. The records can be encrypted and shared independently, without the need to modify and transmit the full data set. Although the records are encrypted with their own encryption key, they are all accessible by a single authentication method.

18 Claims, 5 Drawing Sheets

(56) References Cited

U.S. PATENT DOCUMENTS

| | | | | |
|---|---|---|---|---|
| 8,837,725 | B2* | 9/2014 | Teruyama | H04L 9/0894 |
| | | | | 380/255 |
| 9,202,074 | B1* | 12/2015 | Bennett | H04L 63/104 |
| 9,215,076 | B1* | 12/2015 | Roth | H04L 63/062 |
| 9,230,109 | B2* | 1/2016 | Wooten | H04L 9/0897 |
| 9,275,250 | B2* | 3/2016 | Yoshino | G06F 21/6218 |
| 9,806,887 | B1* | 10/2017 | Campagna | H04L 9/3242 |
| 9,813,414 | B2* | 11/2017 | Camenisch | H04L 9/3236 |
| 9,998,435 | B1* | 6/2018 | Kothari | H04L 63/061 |
| 10,013,363 | B2* | 7/2018 | Tucker | H04L 9/0869 |
| 10,411,886 | B1* | 9/2019 | Vermeulen | H04L 63/061 |
| 10,521,623 | B2* | 12/2019 | Rodriguez | H04L 9/0861 |
| 2003/0081784 | A1* | 5/2003 | Kallahalla | H04L 9/0891 |
| | | | | 380/277 |
| 2003/0081787 | A1* | 5/2003 | Kallahalla | G06F 21/6209 |
| | | | | 380/278 |
| 2003/0140227 | A1* | 7/2003 | Asano | H04L 9/0836 |
| | | | | 713/157 |
| 2003/0142824 | A1* | 7/2003 | Asano | H04L 9/0836 |
| | | | | 380/277 |
| 2003/0179885 | A1* | 9/2003 | Gentry | H04L 9/3252 |
| | | | | 380/277 |
| 2004/0146015 | A1* | 7/2004 | Cross | H04L 63/0823 |
| | | | | 370/328 |
| 2005/0193203 | A1* | 9/2005 | Freeman | H04L 63/18 |
| | | | | 713/171 |
| 2006/0129806 | A1* | 6/2006 | Walmsley | B41J 2/17546 |
| | | | | 713/161 |
| 2006/0143454 | A1* | 6/2006 | Walmsley | G06F 21/85 |
| | | | | 713/170 |
| 2006/0204008 | A1* | 9/2006 | Matsushita | H04L 9/0836 |
| | | | | 380/255 |
| 2006/0291660 | A1* | 12/2006 | Gehrmann | H04L 63/045 |
| | | | | 380/277 |
| 2007/0263875 | A1* | 11/2007 | Kitaya | H04L 9/0836 |
| | | | | 380/279 |
| 2008/0044028 | A1* | 2/2008 | Sun | H04L 9/0838 |
| | | | | 380/278 |
| 2008/0075280 | A1* | 3/2008 | Ye | H04K 1/00 |
| | | | | 380/44 |
| 2008/0095368 | A1* | 4/2008 | Iida | H04L 63/0272 |
| | | | | 380/259 |
| 2008/0244721 | A1* | 10/2008 | Barrus | G06F 21/6254 |
| | | | | 726/9 |
| 2009/0129590 | A1* | 5/2009 | Konuma | H04L 9/0838 |
| | | | | 380/44 |
| 2009/0180612 | A1* | 7/2009 | Leu | H04N 7/17318 |
| | | | | 380/200 |
| 2010/0169645 | A1* | 7/2010 | McGrew | H04L 9/3242 |
| | | | | 713/170 |
| 2010/0183150 | A1* | 7/2010 | Lee | H04L 9/0861 |
| | | | | 380/255 |
| 2010/0185852 | A1* | 7/2010 | Ogawa | G06F 21/602 |
| | | | | 713/165 |
| 2010/0211779 | A1* | 8/2010 | Sundaram | H04L 9/3073 |
| | | | | 713/168 |
| 2010/0325732 | A1* | 12/2010 | Mittal | H04L 63/065 |
| | | | | 726/26 |
| 2010/0333131 | A1* | 12/2010 | Parker | H04N 21/632 |
| | | | | 725/31 |
| 2011/0078453 | A1* | 3/2011 | Mueck | H04L 9/0838 |
| | | | | 713/179 |
| 2011/0138192 | A1* | 6/2011 | Kocher | H04L 9/3247 |
| | | | | 713/189 |
| 2011/0158405 | A1* | 6/2011 | Choi | H04L 9/0838 |
| | | | | 380/44 |
| 2012/0039472 | A1* | 2/2012 | Liu | H04W 12/0431 |
| | | | | 380/270 |
| 2012/0087494 | A1* | 4/2012 | Spalka | H04L 9/0825 |
| | | | | 380/46 |
| 2013/0121487 | A1* | 5/2013 | Lorberbaum | H04N 21/4627 |
| | | | | 380/44 |
| 2013/0182848 | A1* | 7/2013 | Sundaram | H04L 9/3073 |
| | | | | 380/277 |
| 2013/0191632 | A1* | 7/2013 | Spector | H04L 9/0847 |
| | | | | 713/155 |
| 2013/0227279 | A1* | 8/2013 | Quinlan | G06F 21/445 |
| | | | | 713/165 |
| 2013/0227280 | A1* | 8/2013 | Quinlan | H04L 9/08 |
| | | | | 713/165 |
| 2013/0227287 | A1* | 8/2013 | Quinlan | H04W 12/082 |
| | | | | 713/168 |
| 2013/0287206 | A1* | 10/2013 | Hattori | H04L 9/0847 |
| | | | | 380/30 |
| 2014/0108786 | A1* | 4/2014 | Kreft | G06F 21/335 |
| | | | | 713/156 |
| 2014/0281520 | A1* | 9/2014 | Selgas | H04L 9/0825 |
| | | | | 713/165 |
| 2014/0321643 | A1* | 10/2014 | Liu | H04L 9/3066 |
| | | | | 380/45 |
| 2015/0071435 | A1* | 3/2015 | Bhattachar | H04W 12/03 |
| | | | | 380/30 |
| 2015/0178515 | A1* | 6/2015 | Cooley | G06F 21/31 |
| | | | | 713/155 |
| 2015/0256336 | A1* | 9/2015 | Stiglic | H04L 9/0825 |
| | | | | 380/281 |
| 2016/0065362 | A1* | 3/2016 | Choyi | H04L 9/0847 |
| | | | | 380/279 |
| 2016/0065370 | A1* | 3/2016 | Le Saint | H04L 9/14 |
| | | | | 713/155 |
| 2016/0218875 | A1* | 7/2016 | Le Saint | H04L 63/0435 |
| 2016/0269182 | A1* | 9/2016 | Sriram | H04L 9/3242 |
| 2017/0034137 | A1* | 2/2017 | Pillai | H04L 63/061 |
| 2017/0055148 | A1* | 2/2017 | Zimmerman | H04L 9/0825 |
| 2017/0085377 | A1* | 3/2017 | Pogmore | H04L 9/0643 |
| 2017/0085543 | A1* | 3/2017 | Choi | H04L 63/0435 |
| 2017/0111330 | A1* | 4/2017 | Mosko | H04L 63/123 |
| 2017/0207917 | A1* | 7/2017 | Davis | H04L 9/3066 |
| 2017/0351871 | A1* | 12/2017 | Christiansen | H04L 63/0407 |
| 2018/0007014 | A1* | 1/2018 | Neal | H04L 9/3213 |
| 2018/0012032 | A1* | 1/2018 | Radich | H04L 9/30 |
| 2018/0048464 | A1* | 2/2018 | Lim | H04L 63/061 |
| 2018/0069699 | A1* | 3/2018 | Bowman | H04L 9/0841 |
| 2018/0191495 | A1* | 7/2018 | Miller | G06F 21/602 |
| 2019/0050832 | A1* | 2/2019 | Wright | H04L 9/3066 |

OTHER PUBLICATIONS

Zhu et al., PHE: An Efficient Traitor Tracing and Revocation for Encrypted File Syncing-and-Sharing in Cloud, IEEE, Oct. 2018.*

Dashlane Security Whitepaper, https://web.archive.org/web/20161118081758/https://www.dashlane.com/download/Dashlane-Security-Whitepaper-V2.8.pdf, Mar. 2016, 14 pages. Accessed Jun. 22, 2018.

Dashlane Security Whitepaper, https://web.archive.org/web/20170314195016/https://www.dashlane.com/download/Dashlane-Security-Whitepaper-V2.8.pdf, Feb. 2017, 14 pages. Accessed Jun. 22, 2018.

LastPass How It Works, https://web.archive.org/web/20170315085743/https://www.lastpass.com/how-it-works, 7 pages. Accessed Jun. 22, 2018.

LastPass Enterprise Features, https://web.archive.org/web/20170128100859/https://lastpass.com/enterprise/enterprise-features/, 4 pages. Accessed Jun. 22, 2018.

LastPass Enterprise Security, https://web.archive.org/web/20170128115027/https://lastpass.com/enterprise/security/, 8 pages. Accessed Jun. 22, 2018.

* cited by examiner

ENCRYPTED DATA SHARING WITH A HIERARCHICAL KEY STRUCTURE

CROSS-REFERENCE TO RELATED APPLICATIONS

This Application claims priority to U.S. Provisional Patent Application Ser. No. 62/476,763, filed on Mar. 25, 2017, entitled "Encrypted Data Sharing with a Hierarchical Key Structure,", the entire disclosure of which is incorporated herein by reference.

FIELD

The disclosure relates generally to data encryption, and more particularly, to shared data encryption with a hierarchical key structure.

BACKGROUND

When encrypting data, a data encryption key is typically provided as an input to an encryption algorithm, such as AES. The key itself can be stored in a file and encrypted by a password. The password can be processed by a key derivation function. The result of key derivation function can be used as a key to a symmetric encryption algorithm that decrypts the data encryption key. Then, the decrypted data encryption key is used to decrypt the desired data.

Some ciphers, such as the AES256 cipher, are considered unbreakable. However, an attacker may gain an unauthorized access to the encrypted data by trying combinations of the password until the right one is found. This is referred to as a brute-force attack. A common defense against such a brute-force attack is to run the password through many iterations of a key derivation function. The principle is that an application of the key derivation function is inherently slow because of the number of iterations used, so that the brute-force attack is forced to wait much longer for all of the attempts, thereby making the brute force attack take longer than is reasonably feasible.

Such an encryption/decryption method typically requires that the full data set is decrypted and then re-encrypted for even a small modification to the data in the data set. This may not be practical for larger data sets.

BRIEF DESCRIPTION OF THE DRAWINGS

For a better understanding of the inventive subject matter, reference may be made to the accompanying drawings in which.

DETAILED DESCRIPTION

Figure 1:
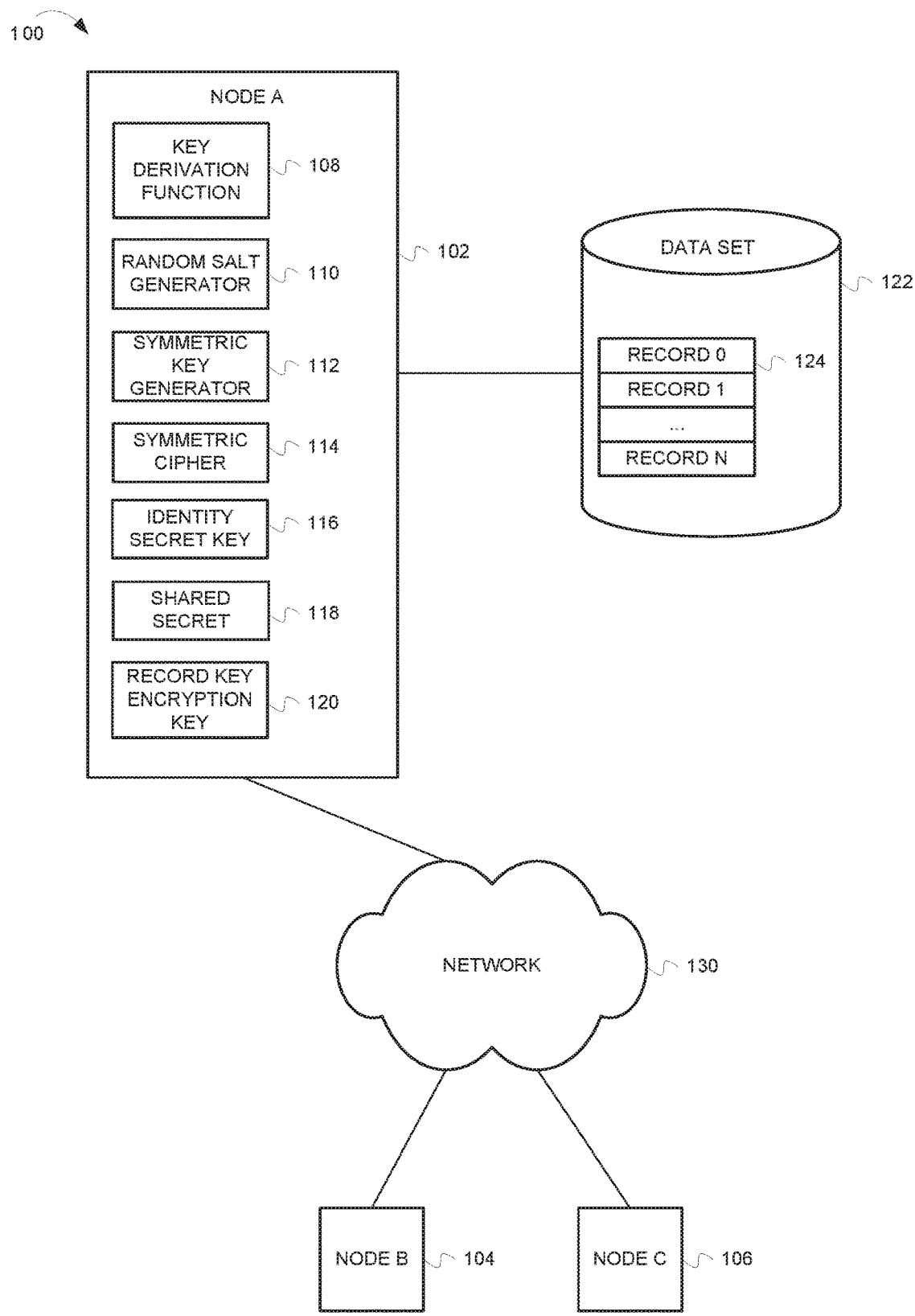
FIG. 1 is a block diagram illustrating an example system to provide encryption of shared data using a hierarchical key structure.

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

FIG. 1 is a block diagram illustrating an example system to provide encryption of shared data using a hierarchical key structure. In some aspects, system 100 can include network nodes (e.g., nodes 102-106) coupled via a network 130, and a data set 122 shared by one or more nodes on the network 130. Network 130 can be any collection of one or more wired networks, wireless networks, or combinations of the two. In some aspects, network 130 can be one or more networks that make up the Internet.

Data set 122 can be a relational database, an object database, a file in a file system, or a collection of files in a file system. Data set 122 can be comprised of multiple records 124. For example, if data set 122 is a database, records 124 can be rows in a table of the database. If data set 122 is a file or collection of files, records 124 can be fixed length records in the file or files. Other mechanisms for defining a record (e.g., record delimiter values) can be used and are within the scope of the inventive subject matter.

A node (e.g., nodes 102-106) can be a server computer, a laptop computer, a tablet computer, a smart phone, a set-top box, an Internet of Things (IoT) device, video game console, or any other device having a processor and memory enabling the device to execute programs. In some aspects, a node such as node 102 can include a key derivation function 108, a random salt generator 110, a symmetric key generator 112, and/or a symmetric cipher 114.

Those of skill in the art having the benefit of the disclosure will appreciate that although FIG. 1 illustrates three nodes (e.g., nodes 102-106), there can be fewer or more nodes than those illustrated in FIG. 1.

Key derivation function (KDF) 108 can be used to derive a secret key from a secret value such as a master key or a password/passphrase. In some embodiments, a cryptographic hash such as SHA-2 or MD5 is used to generate the resulting key. A random value called "salt" can be combined with the secret value to increase randomness of the secret value and/or to produce different outputs for the same input. A combination of a salt and a secret value means that the salt is appended or prepended to the secret value.

Random salt generator 110 generates a random value for use as a salt value for the KDF 108. In some aspects, the random salt generator can be, or can utilize, a random number generator.

Symmetric key generator 112 generates a random key that can be used for encrypting individual records 124 in a data set 122.

Symmetric cipher 114 is a cryptographic algorithm used to encrypt and decrypt data. The cipher is referred to as symmetric because the same key is used for both encryption and decryption. In some aspects, symmetric cipher 114 is an Advanced Encryption Standard (AES) algorithm. However, other symmetric cryptographic algorithms now known or developed in the future can be substituted for the AES algorithm. For example, symmetric ciphers such as 3DES or Blowfish can be used.

Shared secret 118 can be a secret value that is shared between a node and another node on network 130. Individual shared secrets can be maintained for multiple nodes. For example, node A 102 may maintain a shared secret between itself and node B 104, and another shared secret between itself and node C 106. Similarly, node B 104 may maintain a shared secret between itself and node C 106. In some aspects, the shared secret 118 can be derived using an elliptic curve key pair using the Elliptic Curve Diffie-Hellman protocol (ECDH). In ECDH, two nodes exchange their public keys. Each node is then able to obtain a shared secret 118 using their own private key combined with the other node's public key. The shared secret 118 corresponds to a point on a pre-defined elliptic curve. In alternative aspects, the shared secret 118 can be derived using another way of a shared secret exchange. For example, a Diffie-Hellman algorithm can be used to exchange a shared secret.

The use of KDF 108, random salt generator 110, symmetric key generator 112, and symmetric cipher 114 to generate an identity secret key 116 and a record key encryption key 120 for use in encrypting data shared by nodes 102-106 in data set 122 will be further described below with respect to FIGS. 2-5.

Figure 2:
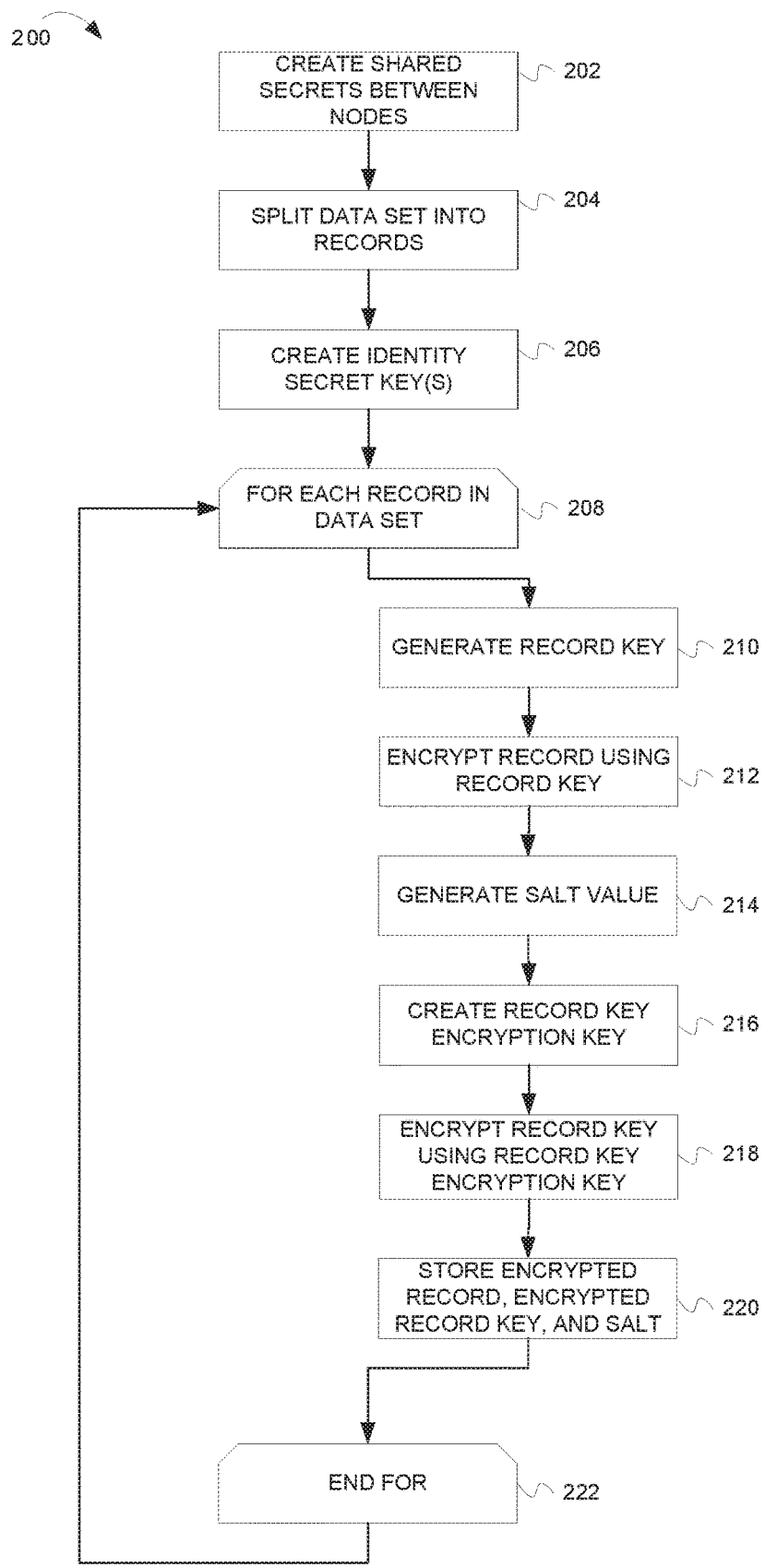
FIG. 2 is a flow chart illustrating operations of a method for encrypting shared data using a hierarchical key structure.

FIG. 2 is a flow chart illustrating operations of a method for encrypting shared data using a hierarchical key structure. At block 202, the nodes that are to share data in a data set (e.g., data set 122) create shared secret values between themselves. As noted above, in some aspects, the nodes can generate an elliptic curve key pair, which, by the properties of the elliptic curve algorithm, creates shared secrets between the nodes. Alternatively, the nodes can perform a shared secret exchange, for example, using the Diffie-Hellman algorithm. Other methods of shared secret exchange known in the art or developed in the future may also be used. Once a shared secret between the nodes is obtained, it can be used directly in the encryption. In alternative embodiments, nodes can exchange a full key pair (public+private key) via a secure channel (for example, encrypted by the shared secret). Such a shared key pair will be referenced as a shared key in this document. Then, instead of using an own private key with other node's public key, a combination of the shared private key with other node's public key can be used. This can make the key management easier, because the decrypting node doesn't need to figure out which node has encrypted the data. Such a shared private key with a public key combination also creates a shared secret, although different from the shared secrets 118 described above.

At block 204, the data set can be split into records. Various means can be used to determine how the data set is to be split. For example, if the data in the data set comprises multiple instances of structured information, then the data set can be split according to the structures. For example, a data set that comprises a database can be split according to rows in tables of the database. Alternatively, a data set can be split into blocks having a predefined or configurable block size.

At block 206, a node participating in the sharing of data set 122 creates an identity secret key (ISK) 116 by processing the shared secret 118 obtained as discussed above through a key derivation function. In some embodiments, an ISK 116 can be created for each shared secret maintained by a node. For example, assume a node A, node B and node C intend to share data. In this example, there would be three shared secrets, one each for the node pairs AB, AC, and BC. If node A were to create the shared data set, the node A can create three ISKs, one for each shared secret.

Block 208 is the top of a loop of operations that are performed for each record in data set 122.

At block 210, a record key is generated. In some aspects, a random symmetric key is used for the record key. In some embodiments, the record key can be random number.

At block 212, the record is encrypted using the record key generated at block 210. In some aspects, a symmetric cipher 114 (e.g., AES) is used along with the record key to encrypt the record.

At block 214, a salt is generated. The salt can be a random value, for example, produced by a random number generator.

At block 216, a record key encryption key is created. In some aspects, the salt generated at block 214 and the ISK 116 created at block 206 are combined into the record key encryption key using KDF 108, using many iterations. The number of iterations can vary depending on performance and security concerns. For example, Applications normally can use anywhere between 5000 and 100,000 iterations. In some aspects, the number of iterations can be between 10,000 and 20,000 iterations.

At block 218, the record key generated at block 210 is encrypted using the record key encryption key created at block 216. In some aspects, a symmetric cipher 114 (e.g., AES) is used along with the record key encryption key to encrypt the record key.

Blocks 216 and 218 can be repeated for each shared secret known to the node creating the record. For example, if a node A shares data with node B and node C, then as noted above, three shared secrets would exist. An encrypted record key can be generated for each ISK corresponding to a shared secret known to node A.

At block 220, the encrypted record keys, and the salt are stored along with the encrypted record.

Block 222 is the end of the loop starting at block 208. If records remain to be processed, then the method returns to block 208 to process the next record 124 in data set 122. Otherwise, the method ends.

Figure 3:
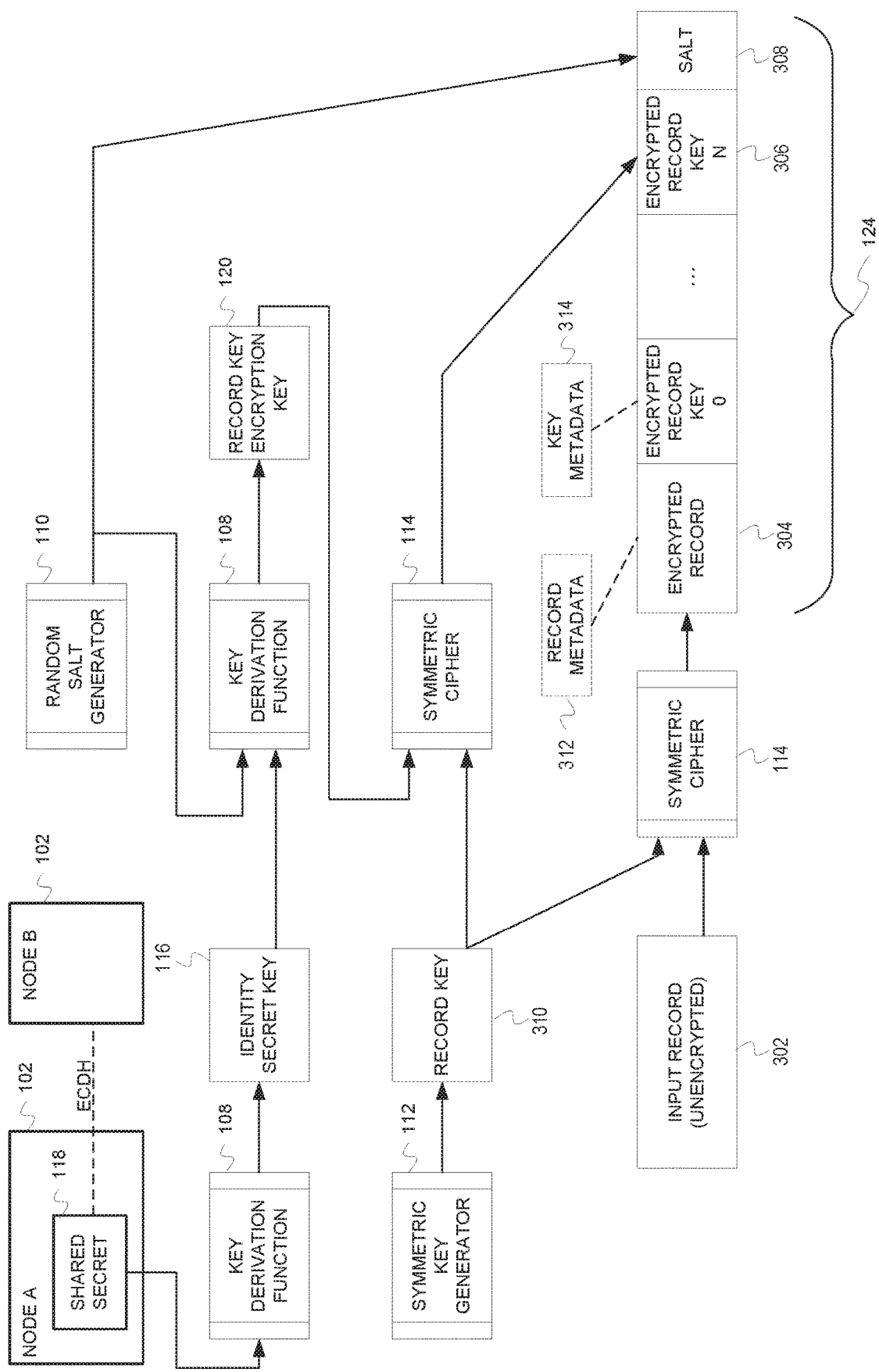
FIG. 3 is a block diagram illustrating inputs and outputs of components of a system to provide encryption of shared data using a hierarchical key structure.

FIG. 3 is a block diagram illustrating inputs and outputs of components of a system to provide encryption of shared data using a hierarchical key structure.

A node creating a record (e.g., node A 102), creates an ISK 116 for each node that is to share the record in the data set. For example, node A 102 maintains a shared secret 118 with node B 104. The shared secret can be put through a KDF 108 to generate an ISK 116 that corresponds to the shared secret between node A 102 and node B 104. A node can generate an ISK for each shared secret it maintains.

Random salt generator 110 generates a salt value that is used as an input to KDF 108, and is also stored as salt 308 associated with encrypted record 304.

ISK 116 and the salt value are inputs to KDF 108, which produces record key encryption key 120 as output.

The record key encryption key 120 and a record key 310 generated by a symmetric key generator 112 are input to a symmetric cipher 114 (e.g., an AES cipher). The output of the symmetric cipher is an encrypted record key 306 that is associated with encrypted record 304. An encrypted record key can be generated using each ISK 116 that is created as discussed above.

An unencrypted record 302 and record key 310 are input to symmetric cipher 114 to produce encrypted record 304.

As illustrated in FIG. 3, there can be multiple encrypted record keys (depending on the number of nodes sharing the record). A position of an encrypted record key 306 in a series of encrypted record keys can be determined in some embodiments by using a hash of the public key of the other party. For example, in some embodiments, the encrypted record 304 and the encrypted record keys 306 can have associated metadata used for data exchange, encryption and lookup. The metadata need not be encrypted. For example, the record metadata 312 can contain a unique identifier of the encrypted record 304 and a timestamp of the last modification. Similarly, the record key metadata 314 for an encrypted record key 306 can contain a digest of a node public key (also called a hash, a number derived from the public key). A node can calculate the digest before an encryption and can compare it with the available encrypted record key digests to find the matching one.

Figure 4:
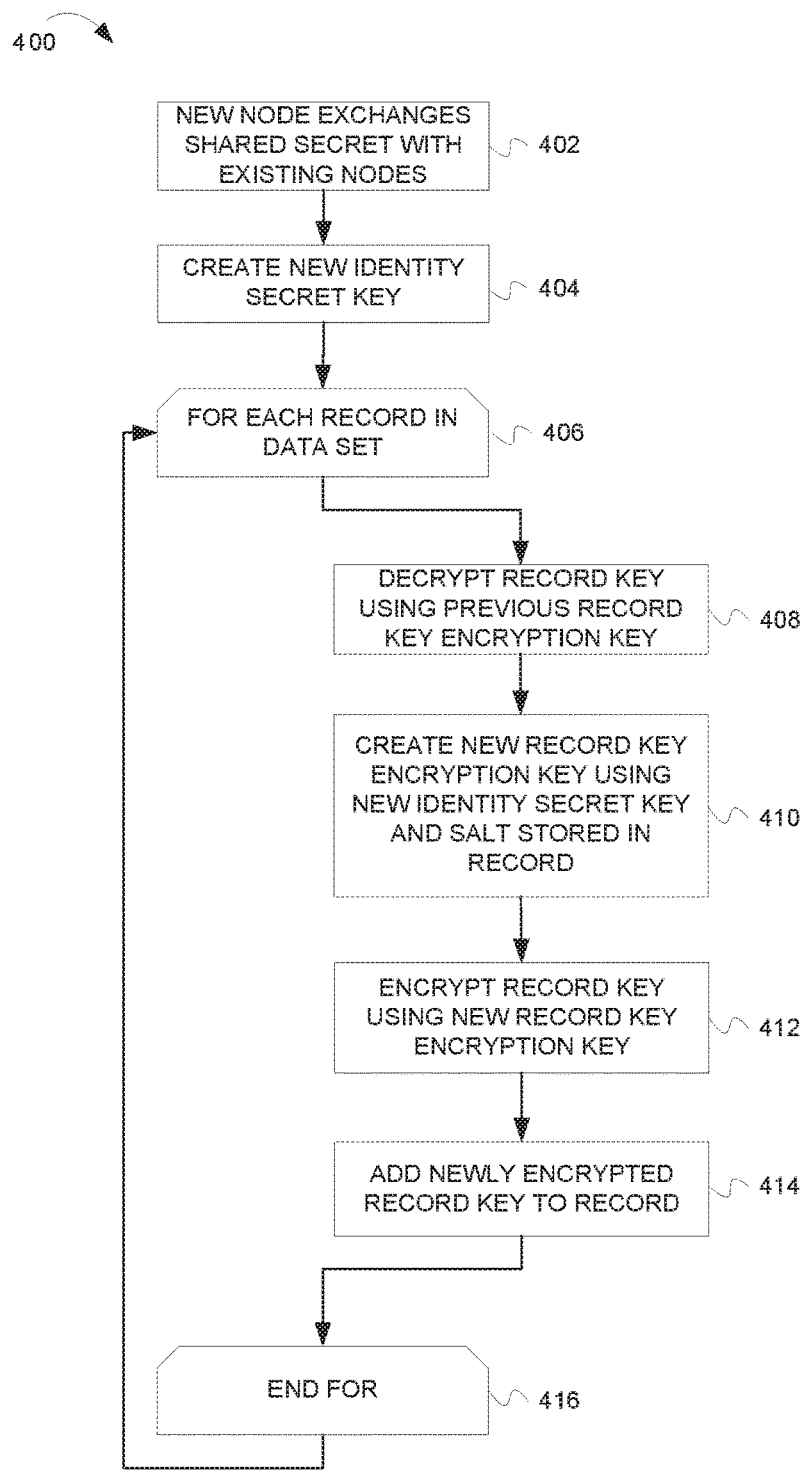
FIG. 4 is a flow chart illustrating operations of a method for adding a record to a shared encrypted data set.

FIG. 4 is a flow chart illustrating operations of a method for adding a new node that is to participate in sharing an encrypted data set. In some embodiments, a confirmation process is used to confirm that the new node is allowed to join the group before any of the operations described below are performed. For example, an authorization and/or authentication process may be used to confirm that the new node is allowed to join the group.

At block 402, new shared secrets are created between the new node and the nodes previously sharing the data. In some aspects, the new node can share its public elliptic curves key. In alternative aspects, a Diffie-Hellman based shared secret exchange can be used. In some embodiments, the new node obtains shared key shared by a group of nodes.

The update of the data set as described below can be performed by the new node, a first available node, a predefined master node, or by the node that confirms the new node is allowed to share the data set.

At block 404, a new ISK 116 is created by the participating nodes.

Block 406 is the top of a loop of operations that are executed by an existing node to update the encryption key for each record in the data set 122. The encrypted data of the record (e.g., encrypted record 304 (FIG. 3)) is not modified in this process.

At block 408, the previously encrypted record key 306 (FIG. 3) is decrypted using the previous record key encryption key 120 (FIG. 1) known by the existing node.

At block 410, a new record key encryption key is generated as described above with respect to FIG. 2 using the stored salt value 308 and the new ISK 116 generated at block 404.

At block 412, the record key is encrypted using the new record key encryption key created at block 410.

At block 414, the newly encrypted record key is added to the record while maintaining the previous encrypted record key as part of the record.

Block 416 is the bottom of the loop of operations executed for each record. If a record remains to be processed, then the method returns to block 406. Otherwise, the method ends.

As can be seen from the above, some embodiments can provide advantages over conventional data encryption/decryption methodologies. A technical problem in many conventional systems is that the encryption/decryption methods typically require that the full data set is decrypted and then re-encrypted for even a small modification to the data in the data set. Larger data sets may make such a methodology impractical as it can take large amounts of compute resources. The embodiments described above can provide a technical solution to this problem by only decrypting/encrypting the data (e.g., the record) that is needed by the system at a particular point in time. Thus, the embodiments can improve the functionality of a computer system by reducing the resources required to encrypt/decrypt data while maintaining the security of the data.

Figure 5:
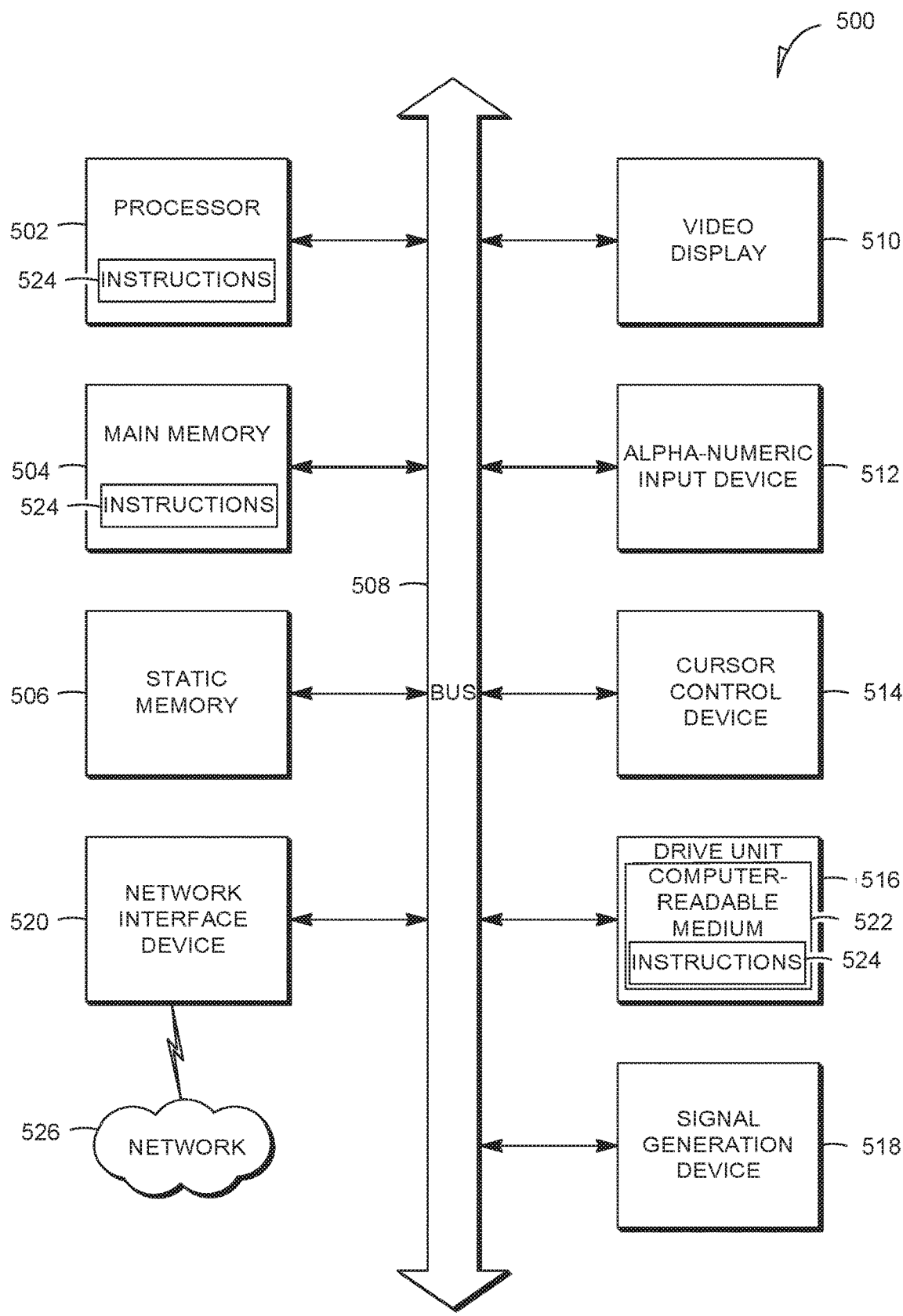
FIG. 5 is a block diagram of an example embodiment of a computer system upon which embodiments of the inventive subject matter can execute.

FIG. 5 is a block diagram of an example embodiment of a computer system 500 upon which embodiments of the inventive subject matter can execute. The description of FIG. 5 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As indicated above, the system as disclosed herein can be spread across many physical hosts. Therefore, many systems and sub-systems of FIG. 5 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, smart phones, network PCs, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

With reference to FIG. 5, an example embodiment extends to a machine in the example form of a computer system 500 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 500 may include a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). In example embodiments, the computer system 500 also includes one or more of an alpha-numeric input device 512 (e.g., a keyboard), a user interface (UI) navigation device or cursor control device 514 (e.g., a mouse), a disk drive unit 516, a signal generation device 518 (e.g., a speaker), and a network interface device 520.

The disk drive unit 516 includes a machine-readable medium 522 on which is stored one or more sets of instructions 524 and data structures (e.g., software instructions) embodying or used by any one or more of the methodologies or functions described herein. The instructions 524 may also reside, completely or at least partially, within the main memory 504 or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 524 may further be transmitted or received over a communications network 526 using a signal transmission medium via the network interface device 520 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A method for encrypting data in a data set shared between a plurality of nodes, the method comprising:
  creating a first identity secret key by processing a first shared secret maintained by a first two of the plurality of nodes;
  generating a first record key;
  encrypting a first record in the data set using the first record key;
  generating a first record key encryption key based, at least in part, on the first identity secret key and a first salt value;
  encrypting the first record key using the first record key encryption key to create a first encrypted record key;
  storing the first encrypted record in association with the first encrypted record key and the first salt value; and creating a second identity secret key by processing a second shared secret maintained by a second two of the plurality of nodes;

generating a second record key;

encrypting a second record in the data set using the second record key;

generating a second record key encryption key based, at least in part, on the second identity secret key and a second salt value;

encrypting the second record key using the second record key encryption key to create a second encrypted record key; and storing the second encrypted record in association with the second encrypted record key and the second salt value.

2. The method of claim 1, wherein generating the first record key comprises providing the first identity secret key and the first salt value to a key derivation function, and wherein generating the first record key comprises providing the second identity secret key and the second salt value to a key derivation function.

3. The method of claim 1, further comprising determining records for the data set.

4. The method of claim 3, wherein determining records for the data set comprises determining one of fixed size records for a file comprising the data set or determining rows in tables of the data set.

5. The method of claim 1, further comprising generating the first shared secret and the second shared secret using an elliptic curve key pair.

6. The method of claim 1, wherein creating the first identity secret key using a first shared secret comprises processing the first shared secret using a key derivation function, and wherein creating the second identity secret key using a second shared secret comprises processing the second shared secret using a key derivation function.

7. A non-transitory machine-readable medium having stored thereon instructions for encrypting data in a data set shared between a plurality of nodes, the instructions comprising computer executable instructions to cause one or more processors to:

create first identity secret key by processing a first shared secret maintained by a first two of the plurality of nodes;

generate a first record key;

encrypt a first record in the data set using the first record key;

generate a first record key encryption key based, at least in part, on the first identity secret key and a first salt value;

encrypt the first record key using the first record key encryption key to create a first encrypted record key;

store the first encrypted record in association with the first encrypted record key and the first salt value;

create a second identity secret key by processing a second shared secret maintained by a second two of the plurality of nodes;

generate a second record key;

encrypt a second record in the data set using the second record key;

generate a second record key encryption key based, at least in part, on the second identity secret key and a second salt value;

encrypt the second record key using the second record key encryption key to create a second encrypted record key; and store the encrypted record in association with the second encrypted record key and the second salt value.

8. The non-transitory machine-readable medium of claim 7, wherein the computer executable instructions to generate the first record key include computer executable instructions to provide the first identity secret key and the first salt value to a key derivation function and wherein the computer executable instructions to generate the second record key include computer executable instructions to provide the second identity secret key and the second salt value to a key derivation function.

9. The non-transitory machine-readable medium of claim 7, wherein the computer executable instructions further comprise computer executable instructions to determine records for the data set.

10. The non-transitory machine-readable medium of claim 9, wherein the computer executable instructions to determine records for the data set comprise computer executable instructions to determine one of fixed size records for a file comprising the data set or determining rows in tables of the data set.

11. The non-transitory machine-readable medium of claim 7, wherein the computer executable instructions further comprise computer executable instructions to generate the first shared secret and the second shared secret using an elliptic curve key pair.

12. The non-transitory machine-readable medium of claim 7, wherein the computer executable instructions to create the identity secret key using a shared secret comprises computer executable instructions to process the first shared secret and the second shared secret using a key derivation function.

13. An apparatus for encrypting data in a data set shared between a plurality of nodes, the apparatus comprising:

one or more processors; and a non-transitory machine-readable medium having stored thereon computer executable instructions to cause the one or more processors to:

create a first identity secret key by processing a first shared secret maintained by a first two of the plurality of nodes;

generate a first record key;

encrypt a first record in the data set using the first record key;

generate a first record key encryption key based, at least in part, on the first identity secret key and a first salt value;

encrypt the first record key using the first record key encryption key to create a first encrypted record key;

store the first encrypted record in association with the first encrypted record key and the first salt value;

create a second identity secret key by processing a second shared secret maintained by a second two of the plurality of nodes;

generate a second record key;

encrypt a second record in the data set using the second record key;

generate a second record key encryption key based, at least in part, on the second identity secret key and a second salt value;

encrypt the second record key using the second record key encryption key to create a second encrypted record key; and store the second encrypted record in association with the second encrypted record key and the second salt value.

14. The apparatus of claim 13, wherein the computer executable instructions to generate the first record key include computer executable instructions to provide the first identity secret key and the first salt value to a key derivation function and wherein the computer executable instructions to generate the second record key include computer executable instructions to provide the second identity key and the second salt value to a key derivation function.

15. The apparatus of claim 13, wherein the computer executable instructions further comprise computer executable instructions to determine records for the data set.

16. The system of claim 15, wherein the computer executable instructions to determine records for the data set comprise computer executable instructions to determine one of fixed size records for a file comprising the data set or determining rows in tables of the data set.

17. The apparatus of claim 13, wherein the computer executable instructions further comprise computer executable instructions to generate the first and second shared secrets using an elliptic curve key pair.

18. The apparatus of claim 13, wherein the computer executable instructions to create the first identity secret key using a first shared secret comprise computer executable instructions to process the first shared secret using a key derivation function, and wherein the computer executable instructions to create the second identity secret key using a second shared secret comprise computer executable instructions to process the second shared secret using a key derivation function.

* * * * *